3,330,731
WATER-OIL EMULSION OF COPOLYMER OF AN OLEFINICALLY-UNSATURATED CARBOXYLIC ACID AND POLYALKENYL POLYETHER OF A POLYHYDRIC ALCOHOL, AND POLYOXYALKYLENE ESTER OF COCONUT FATTY ACIDS
Robert James Mehaffey, River Edge, N.J., assignor to Colgate-Palmolive Company, New York, N.Y., a corporation of Delaware
No Drawing. Filed Aug. 3, 1962, Ser. No. 214,499
8 Claims. (Cl. 167—87)

This invention relates to new compositions of matter. More particularly, the invention relates to stable emulsions particularly suitable for use as hair dressing preparations.

In general, the new emulsions of the invention have an oily phase and an aqueous phase and comprise oil which is insoluble in water, hydrophilic carboxy vinyl polymer, polyoxy lower alkylene ester of a mixture of higher fatty acids of 8 to 18 carbons, in which mixture of acids about 40 to 60 percent is lauric acid, 10 to 20 percent is myristic acid and 20 to 40 percent is of other fatty acid of 8 to 18 carbons, and water.

The water insoluble oils which can be utilized in the preparation of the emulsions of the invention include saturated and unsaturated hydrocarbon oils and esters of the higher molecular weight fatty acids obtainable from animal or vegetable products, and other oleaginous materials of similar properties. Examples of oils which can be employed in the practice of the invention are mineral oils, such as paraffin oil and homologs thereof, petrolatum, and others obtained from petroleum and its products. Among such useful oils are those containing from about 12 to about 30 carbon atoms. These oils have different viscosities; they may be either light or heavy oils. Suitable oils also include the triglycerides in which the fatty acid portion of the molecule contains from about 10 to 18 carbon atoms. The choice of any particular oil used will depend upon the desired characteristics of the final product. For example, in a hair dressing, where the product is to be extruded from a tube, a heavier oil will be employed. On the other hand, where it is desirable to manufacture a lotion emulsion which can be poured from a container such as a bottle or the like, a lighter oil may be utilized. The oils most suitable for a particular intended purpose can be determined by routine testing and may be selected for use on such a basis.

The carboxy vinyl polymers employed in the new emulsions are generally synthetic mucilaginous hydrophilic substances which preferably contain carboxylic salt groups. It is preferred to employ cross-linked polymers which are produced by the polymerization or intermolecular reaction of two or more different monomers containing polyfunctional groups. The term polymer includes, therefore, copolymers. Suitable examples of such polymers are disclosed in British patent specification No. 799,951 published Aug. 13, 1958 and U.S. Patent 2,798,053, granted July 2, 1957. The polymers disclosed therein are compositions comprising a cross-linked interpolymer of (a) a monoolefinic monomeric material comprising at least 25 percent by weight of a monomeric olefinically-unsaturated carboxylic acid containing at least one activated carbon-to-carbon double bond, such as acrylic acid, and (b) from about 0.01 to 10.0 percent by weight of a polyunsaturated cross-linking agent containing a plurality of polymerizable vinyl or crotyl groups, such as a polyalkenyl polyether of a polyhydric alcohol. More particularly, the preferred interpolymers are derived from a mixture of acrylic acid and a polyether of sucrose in which the hydroxyl groups which are modified are etherified with at least two allyl groups per molecule. A specific example of such a material is one containing about 97.5 to 99.8 percent by weight of a monomeric polyether of sucrose in which the hydroxyls are etherified with at least two and preferably about five to about six allyl groups per sucrose molecule. Such carboxylic polymers are available commercially in the free acid form and are preferably at least partially neutralized by the presence of bases such as alkali and alkaline earth metal hydroxides or amine bases which are defined more particularly hereinbelow.

Generally, any basic compound can be utilized to neutralize the polymers defined above. Such compounds include sodium and potassium hydroxides and lithium hydroxide and the like. Examples of amine bases useful in the practice of the invention are mono-, di- and tri-aliphatic amines containing from 1 to about 20 carbon atoms in the aliphatic carbon chain and wherein the substituent groups can be the same or different in the di- and tri- compounds. However, the amines containing one or more alkyl groups containing 6 to 18 carbon atoms are especially preferred. Specific useful amine bases include mono-, di- and tri- hexyl, lauryl and stearyl amines and the like. Additional amine bases are alkylolamines containing from 1 to 12 carbon atoms in the alkyl group such as mono-, di- and tri-methanolamines, ethanolamines, propanolamines, etc. and the like. A particularly effective alkylolamine is triethanolamine.

The useful polyoxy lower alkylene esters which have a molecular weight in a range of about 200 to 800 and comprise esters of a mixture of higher fatty acids of 8 to 18 carbons as mentioned above, have been found to be unexpectedly beneficial in the preparation of emulsions, in accordance with the invention, which maintain stability over long periods of time. This is so whether the emulsions be highly viscous materials extrudable from a tube or pourable lotions. A mixture of the mentioned esters may be obtained by esterifying the polyoxy lower alkylene compound with coconut oil acids and/or palm kernel oil acids which comprise mixtures of the higher fatty acids containing 8 to 18 carbon atoms, within the scope of this invention. Examples of these esters are the polyoxyethylene, polyoxypropylene and polyoxybutylene esters of the 8 to 18 carbon atom fatty acids, such as such esters of myristic acid, lauric acid, palmitic acid, and the like. Preferable esters include in this classification are the polyoxy lower alkylene esters of the acids mentioned, which esters have a molecular weight in a range of about 300 to about 600. A particularly useful ester of this type is polyethylene glycol monococate in which the polyglycol portion of the molecule has a molecular weight of about 400. For example, an emulsion prepared in accordance with the invention containing the monococate in which the polyglycol portion of the molecule has about 400 molecular weight, the cocate portion of which compound was derived from about 50 percent lauric acid, 15 percent myristic acid and about 35 percent of a mixture of the $C_8$, $C_{10}$, $C_{16}$ and $C_{18}$ fatty acids, exhibited superior stability for a period of about 9 weeks at temperatures ranging from −15° C. to +60° C. In contrast, the stability of similar emulsions containing a closely related polyoxyethylene ester substantially of only one higher fatty acid exhibited poor storage and heat stability.

The polyoxy lower alkylene esters mentioned can be utilized alone as an emulsifier and stabilizer or in combination with other emulsifiers. In general, any suitable oil-in-water emulsifier can be employed in a combined or multi-component emulsifier. Preferably however, those employed have an acceptable hydrophile-lipophile balance (HLB) such as will promote the formation of a stable emulsion in combination with the polyoxy lower alkylene ester. Generally, an emulsifier which has an HLB value of about 9 or more can be employed in the practice of the instant invention. Anionic emulsifiers, i.e. those where the active or oil soluble portion of the ionizing molecule is the negative ion, which are useful in this invention include the fatty acid soaps such as sodium, potassium and triethanolamine soaps and the like. Useful nonionic types, i.e., those in which the affinity for water is due to the presence of nonionizing polar groups, include fatty acid esters and ethers of polyhydric alcohols, such as the esters and ethers of polyethylene glycols and modified sugars which do not come within the classification of the mentioned polyoxy lower alkylene esters above. The nonionic emulsifiers also include substituted fatty acid amides and alkylolamides. Surface active agents in combination with long chain fatty materials also have been found useful in emulsifying the oily materials. These blends are exemplified by mixtures of alcohols and surface active agents, such as cetyl alcohol or cholesterol with sodium cetyl sulfate. Additional blends include glyceryl and glycol esters with water soluble surface active agents, such as glyceryl monostearate with potassium stearate. Further blends include combinations of soaps with free fatty acids.

Additional examples of useful emulsifiers include polyoxyethylene sorbitan mono-oleate, polyoxyethylene esters of resin acids, polyoxyethylene cetyl ether, polyoxyethylene sorbitan monostearate, polyoxyethylene lanolin derivatives and the like. For the sake of simplicity, suitable compounds for causing emulsification which can be used in combination with the mixture of polyoxyalkylene esters of fatty acids of 8 to 18 carbons mentioned above will be referred to hereafter as emulsifiers.

The amounts of the particular constituents employed in the emulsions of the invention can be varied widely. The oil, which forms the discontinuous phase in the invented emulsions, can be employed in a range of about 25 percent to about 55 percent by weight, based on the total weight of the emulsion and preferably is utilized in a range of about 30 to 50 percent. The carboxy vinyl polymer is normally present in relatively minor amounts within a range of about 0.05 percent to about 1.0 percent and preferably in a range of about 0.2 percent to 0.8 percent by weight. The neutralizing base, such as the hydroxides and amines are generally employed in dilute solutions for the sake of manufacturing convenience. It is preferred that enough base be employed to at least partially and preferably to completely neutralize the amount of polymer in any particular emulsion. In general, the base can be present in the emulsion in the range of about 0.2 percent to about 2.0 percent by weight, based on the total weight of the emulsion, and is preferably present in a range of about 0.5 percent to about 1.0 percent.

The polyoxy lower alkylene ester of a mixture of higher fatty acids is utilized in the invented compositions in a range of about 0.25 percent to about 10 percent by weight based on the total emulsion weight. It is preferred, however, to employ this ester in a range of about 0.75 percent to about 1.50 percent in order to obtain the best stability and improved appearance in the product emulsion. Moreover, when this ester is utilized in conjunction with other emulsifiers, the total amount of emulsifier present in the invented compositions should be in a range of about 0.25 percent to about 10 percent by weight, based on the total weight of the composition and preferably in a range of about 1.0 percent to about 3.0 percent and the polyoxy lower alkylene ester of a mixture of fatty acids should comprise at least about 0.75 percent to about 1.5 percent of the total emulsifier content.

The water, which is the continuous phase in the invented emulsions, is employed in a range of about 35 to 65 percent by weight, based on the total emulsion weight and preferably in a range of about 45 to 55 percent by weight.

In an emulsion prepared in accordance with the present invention and which contains a plurality of oils or a plurality of emulsifiers the total amount in weight percent, of the emulsifier or the oil, for best results, should be within the ranges set forth hereinabove. The oils and emulsifiers present may function in such a manner as to accomplish more than one purpose. For example, the paraffin oils, when employed herein, serve to give good consistency and body to the emulsions. At the same time, however, they also act as protective coatings for the hair, for example, in hair dressings made in accordance with this invention. In this regard, where a nonionic ethylene oxide, fatty alcohol and lanolin complex is utilized as a constituent in the emulsion, it may act as a grooming agent to impart luster to the hair, as well as functioning in its role as an emulsifier. When a plurality of oils and/or emulsifiers is present in a particular emulsion, it is to be understood that although the total amounts of oil and/or emulsifier, for best results, should be within the ranges established hereinabove, the amounts or proportions of oils and emulsifiers, with respect to each other, can be varied so long as they come within the ranges mentioned.

The emulsions of this invention can be prepared in a relatively simple manner. In general, the oils, such as mineral oil, petroleum and paraffin wax, and the emulsifier can be mixed together with an aqueous solution of the carboxy vinyl polymer. Caustic soda or other base is then added to the dispersion to neutralize the polymer, along with additional water. Subsequently, various other optional constituents, more specifically mentioned hereinbelow, can then be added to the dispersion while it is constantly being agitated at about room temperature or slightly above (25° to 80° C.) until a stable emulsion is formed. A preferred method for preparing the emulsions comprises mixing mineral oil, petrolatum, emulsifier and paraffin wax in a homogenizing mixer at about 70° to 80° C. and thoroughly agitating the mixture until homogeneity is obtained. Next, a one percent aqueous solution of the carboxy vinyl polymer in distilled water, heated to about the same temperature, is slowly added with agitation. After addition of the aqueous polymer solution is complete, an aqueous solution of base is then added to the dispersion, which is continuously agitated to insure a homogeneous distribution of all the constituents. Finally, optional ingredients such as humectants and antimicrobial agents and perfumes are added to the dispersion and agitation is continued until a stable homogeneous emulsion is obtained.

A variety of optional constituents may be incorporated into the emulsions of this invention. Such constituents include humectants such as propylene glycol, glycerin or sorbitol which are generally employed in an amount of about 5 to 12 percent by weight, based on the total weight of the emulsion, and preferably in a range of about 8 to 10 percent. Antimicrobial compositions, such as hexachlorophene, preservatives, such as parahydroxybenzoates, and perfumes are normally employed in relatively minor amounts of about 0.1 to 0.5 percent by weight. Polyglycols, such as polyethylene glycol and polypropylene glycol and the carbowaxes and the like can also be used in minor amounts of about 1 to 2 percent to improve the feel of the emulsions.

The emulsions of this invention can be employed in a wide variety of cosmetic preparations. For example, the emulsions can be utilized in making skin creams and cosmetic facial preparations, but are particularly useful as hair dressings to impart control, softness and brilliance to the hair. They may be relatively viscous or very fluid compositions. The utilization of the carboxy vinyl polymer in the presence of the polyoxy lower alkylene ester mentioned results in the formation of emulsions which are highly stable and which have good body in contrast to like emulsions formed with other water soluble polymeric compositions. Moreover, the less viscous emulsions can be readily pressurized in conventional aerosol containers with known propellants, such as the Freons and nitrogen.

In order to illustrate the present invention more fully, the following illustrative examples are set forth. In the examples all parts and percents are by weights unless otherwise stated.

EXAMPLE I 30.8 parts of heavy mineral oil, 5.8 parts of petrolatum, 0.1 part of lauryl amine, 1.0 parts of polyethylene glycol monococate in which the polyglycol portion of the molecule has a molecular weight of about 400 and 0.1 part of an ethylene oxide-fatty alcohol and lanolin complex (Neocol 5192, manufactured by Dispergent Company, Guilford, Conn.) were added to an Eppenbach Homomixer at about 65° C. with constant agitation. After the constituents were agitated for a sufficient length of time (about 5 minutes) to result in a homogeneous mixture, there was added thereto, previously heated to the same temperature, 14.1 parts of a 1 percent aqueous solution of a copolymer of about 99 percent by weight of glacial acrylic acid and about 1 percent by weight of polyallyl sucrose in which the sucrose molecule has an average of about 5 to 6 allyl groups. Agitation was continued with the addition of 36 parts of deionized water, followed by the addition of 0.2 part of a 19.1 percent as $Na_2O$, aqueous solution of sodium hydroxide and the addition of 3.5 more parts of deionized water. Next, 8.0 parts of propylene glycol, a humectant, were added to the mixture followed by a 0.3 part of hexachlorophene and 0.1 part of perfume. Agitation was continued for about 15 minutes until a stable homogeneous emulsion was obtained. The emulsion so formed was stored at temperatures ranging from minus 15° to +60° C. and had satisfactory stability over a period of 9 weeks. The emulsion was a pourable lotion emulsion which gave a pleasing texture, good appearance and excellent control when applied to the hair, keeping the hair in place after combing.

The polyethylene glycol monococate employed in this composition contained by weight 50 percent lauric acid ester, 15 percent myristic acid ester, 8 percent caprylic acid ester, 7 percent capric acid ester, 8 percent palmitic acid ester and 12 percent stearic acid ester.

EXAMPLE II

A hair dressing was prepared which contained the following constituents:

Part I

| | Parts |
|---|---|
| Heavy mineral oil | 30.6 |
| White petrolatum | 5.7 |
| Anhydrous lanolin (odorless) | 0.5 |
| Polyethylene glycol monococate in which the polyglycol portion of the molecule has a molecular weight of about 400 | 1.0 |
| Stearyl amine | 0.1 |
| Polypropylene glycol having a molecular weight of about 5,000 | 2.0 |

Part II

| | Parts |
|---|---|
| Deionized water | 26.0 |
| A 2 percent aqueous solution of a copolymer of about 99 percent by weight of glacial acrylic acid and about 1 percent by weight of polyallyl sucrose in which the sucrose molecule has an average of about 5 to 6 allyl groups | 25.0 |

Part III

| | |
|---|---|
| Propylene glycol | 8.0 |
| Sodium hydroxide (19.1 percent as $Na_2O$, aqueous solution) | 0.8 |
| Perfume | 0.3 |

The constituents in Part I were added to an Eppenbach Homomixer in the order shown at about 65° C. with constant agitation. After adding the stearyl amine, agitation was continued for a sufficient length of time (about 5 minutes) to result in a homogeneous mixture. Part II, the constituents of which had been previously mixed together in the order shown and heated to the same temperature, were then added to Part I. Agitation was continued and Part III, the constituents of which were previously mixed together in the order set forth was added to the mixer. After about an additional 15 minutes of agitation a stable, highly viscous homogeneous emulsion was obtained. The emulsion so formed was suitable for extrusion from a tube and exhibited good stability for periods of as long as 6 months and more.

The polyethylene glycol monococate employed in the emulsion contained the same amounts of fatty acid esters as the employed in the emulsion of Example I.

EXAMPLE III

A highly viscous emulsion was prepared in accordance with the procedure of Example II with like results except that the polyethylene glycol monococate employed contained by weight 60 percent of lauric acid ester, 10 percent of myristic acid ester and 30 percent total of caprylic, capric, palmitic and stearic acid esters and the polypropylene glycol was omitted, the difference being compensated for by raising the water from 26 to 28 parts.

EXAMPLE IV

An emulsion suitable for grooming the hair was prepared and contained the following constituents:

Part I

| | Parts |
|---|---|
| Heavy mineral oil | 29.6 |
| Polyethylene glycol monococate in which the polyglycol portion of the molecule has a molecular weight of about 400 | 2.0 |
| Lauryl amine | 0.4 |
| Ethylene oxide-fatty acid and lanolin complex | 0.1 |
| White petrolatum | 5.7 |

Part II

| | |
|---|---|
| A copolymer of about 99 percent by weight of glacial acrylic acid and about 1 percent by weight polyallyl sucrose in which the sucrose molecule has an average of about 5 to 6 allyl groups | 0.3 |
| Deionized water | 50.0 |

Part III

| | |
|---|---|
| Sodium hydroxide (19.1 perecnt as $Na_2O$, aqueous solution) | 0.2 |
| Deionized water | 3.5 |

Part IV

| | |
|---|---|
| Propylene glycol | 8.0 |
| Perfume | 0.2 |

The constituents of Part I were added in the order shown to an Eppenbach Homomixer at about 65° C. with constant agitation. Agitation was continued for a sufficient length of time (about 5 minutes) to result in a homogeneous mixture. Part II, the constituents of which had been previously mixed together in the order shown and heated to the same temperature, was then added to Part I. Agitation was continued and Part III, the constituents of which were previously mixed together in the order shown, was added to the mixer. Finally, Part IV was added to the mixture while agitation was continued. After an additional 15 minutes of agitation a stable homogeneous viscous emulsion was obtained. The emulsion so prepared was stable at all temperatures when tested, such as that emulsion prepared in accordance with Example I. Moreover, the emulsion was a very thick but pourable lotion emulsion which formed an excellent hair dressing.

The polyethylene glycol monococate employed herein contained the same amounts of mixed fatty acid esters as that employed in Example I.

EXAMPLE V

The procedure of Example I was repeated with like results except that the constituents were mixed together in the following order and were employed in the following amounts:

Part I

| | Parts |
|---|---|
| Heavy mineral oil | 31.3 |
| White petrolatum | 5.7 |
| Lauryl amine | 0.1 |
| Polyethylene glycol monococate in which the polyglycol portion of the molecule has a molecular weight of about 400 | 0.5 |
| Neocol 5192 | 0.1 |

Part II

| | |
|---|---|
| A 1 percent aqueous solution of a copolymer of about 99 percent by weight of glacial acrylic acid and about 1 percent by weight polyallyl sucrose in which the sucrose molecule has an average of about 5 to 6 allyl groups | 14.1 |
| Deionized water | 36.0 |

Part III

| | |
|---|---|
| Sodium hydroxide (19.1 percent as $Na_2O$, aqueous solution) | 0.2 |
| Deionized water | 3.5 |

Part IV

| | |
|---|---|
| Propylene glycol | 8.0 |
| Hexachlorophene | 0.3 |
| Perfume | 0.2 |

EXAMPLE VI

The procedure of Example I was once more repeated with similar results and the constituents were employed in the following amounts:

Part I

| | Parts |
|---|---|
| Heavy mineral oil | 59.5 |
| White petrolatum | 11.5 |
| Lauryl amine | 0.3 |
| Polyethylene glycol monococate in which the polyglycol portion of the molecule has a molecular weight of about 400 | 4.0 |
| Neocol 5192 | 0.3 |

Part II

| | |
|---|---|
| A 0.3 percent aqueous solution of a copolymer of about 99 percent by weight of glacial acrylic acid and about 1 percent by weight of polyallyl sucrose in which the sucrose molecule has an average of about 5 to 6 allyl groups | 80.2 |
| Deionized water | 19.7 |

Part III

| | Parts |
|---|---|
| Sodium hydroxide (19.1 percent as $Na_2O$, aqueous solution) | 7.3 |
| Deionized water | 7.0 |

Part IV

| | |
|---|---|
| Propylene glycol | 16.0 |
| Hexachlorophene | 0.5 |
| Perfume | 0.3 |

EXAMPLE VII

Example VI was repeated and the emulsion so formed was pressurized with nitrogen in conventional 6 ounce aerosol containers. The pressurized composition formed an excellent emulsion and gave a pleasing texture to the hair as well as good control keeping the hair in place after combing.

EXAMPLE VIII

The procedure of Example I was repeated with similar results and the constituents were employed in the following amounts:

Part I

| | Parts |
|---|---|
| Heavy mineral oil | 21.8 |
| White petrolatum | 5.8 |
| Lauryl amine | 0.1 |
| Polyethylene glycol monococate in which the polyglycol portion of the molecule has a molecular weight of about 400 | 10.0 |
| Neocol 5192 | 0.1 |

Part II

| | |
|---|---|
| A 0.3 percent aqueous solution of a copolymer of about 99 percent by weight of glacial acrylic acid and about 1 percent by weight of polyallyl sucrose in which the sucrose molecule has an average of about 5 to 6 allyl groups | 25.0 |
| Deionized water | 25.0 |

Part III

| | |
|---|---|
| Sodium hydroxide (19.1 percent as $Na_2O$, aqueous solution) | 0.2 |
| Deionized water | 3.5 |

Part IV

| | |
|---|---|
| Propylene glycol | 8.0 |
| Hexachlorophene | 0.3 |
| Perfume | 0.2 |

EXAMPLE IX

The procedure of Example I was repeated except that the constituents of the emulsion were employed in the following amounts:

Part I

| | Parts |
|---|---|
| Heavy mineral oil | 31.5 |
| White petrolatum | 5.8 |
| Lauryl amine | 0.1 |
| Polyethylene glycol monococate in which the polyglycol portion of the molecule has a molecular weight of about 400 | 0.2 |
| Neocol 5192 | 0.1 |

Part II

| | |
|---|---|
| A 1 percent aqueous solution of a copolymer of about 99 percent by weight of glacial acrylic acid and about 1 percent by weight polyallyl sucrose in which the sucrose molecule has an average of about 5 to 6 allyl groups | 14.1 |
| Deionized water | 36.0 |

Part III

| | |
|---|---|
| Sodium hydroxide (19.1 percent as $Na_2O$, aqueous solution) | 0.2 |
| Deionized water | 3.5 |

Part IV

| | Parts |
|---|---|
| Propylene glycol | 8.0 |
| Hexachlorophene | 0.3 |
| Perfume | 0.2 |

The resulting emulsion was a smooth cream pourable from a container and had a stability similar to the emulsion prepared in Example I.

Numerous variations and modifications of the embodiments of this invention may be made without departing from the spirit and scope thereof. Accordingly, the invention is not to be restricted to the specific embodiments set forth herein except as defined in the appended claims.

What is claimed is:

1. An emulsion which has an oily phase and an aqueous phase comprising water-insoluble oil selected from the group consisting of saturated and unsaturated hydrocarbon oils and triglycerides of higher molecular weight fatty acid and mixtures thereof, a neutralized copolymer of a monomeric mixture comprising at least 25 percent by weight of acrylic acid and from about 0.1 to 10 percent by weight of a polyether of sucrose in which the modified hydroxyl groups are etherified with allyl groups, said polyether containing at least two allyl groups per sucrose molecule, polyoxy lower alkylene ester of a mixture of higher fatty acids of 8 to 18 carbon atoms in which mixture of acids about 40 to 60 percent is lauric acid, 10 to 20 percent is myristic acid and 20 to 40 percent is other fatty acid of 8 to 18 carbon atoms and water.

2. An emulsion which has an oily phase and an aqueous phase comprising by weight, based on the total weight of the emulsion, about 25 to 55 percent of water-insoluble oil selected from the group consisting of saturated and unsaturated hydrocarbon oils and triglycerides of higher molecular weight fatty acid and mixtures thereof, about 0.05 to 1.0 percent of a neutralized copolymer of a monomeric mixture comprising at least 25 percent by weight of acrylic acid and from about 0.1 to 10 percent by weight of a polyether of sucrose in which the modified hydroxyl groups are etherified with allyl groups, said polyether containing at least two allyl groups per sucrose molecule, about 0.25 to 10 percent of polyoxy lower alkylene ester of a mixture of higher fatty acids of 8 to 18 carbon atoms in which mixture of acids about 40 to 60 percent is lauric acid, 10 to 20 percent is myristic acid and 20 to 40 percent is of other fatty acid of 8 to 18 carbon atoms, and about 35 to 65 percent water.

3. An emulsion which has an oily phase and an aqueous phase comprising by weight, based on the total weight of the emulsion, about 30 to 50 percent of water-insoluble oil selected from the group consisting of saturated and unsaturated hydrocarbon oils and triglycerides of higher molecular weight fatty acid and mixtures thereof, about 0.2 to 0.8 percent of a neutralized copolymer of a monomeric mixture comprising at least 25 percent by weight of acrylic acid and from about 0.1 to 10 percent by weight of a polyether of sucrose in which the modified hydroxyl groups are etherified with allyl groups, said polyether containing at least two allyl groups per sucrose molecule, about 0.75 to 1.5 percent of polyoxy lower alkylene ester of a mixture of higher fatty acids of 8 to 18 carbon atoms in which mixture of acids about 40 to 60 percent is lauric acid, 10 to 20 percent is myristic acid and 20 to 40 percent is of other fatty acid of 8 to 18 carbon atoms, and about 45 to 55 percent water.

4. An emulsion which has an oily phase and an aqueous phase comprising by weight, based on the total weight of the emulsion, about 25 to 55 percent of at least one water-insoluble oil selected from the group consisting of saturated and unsaturated hydrocarbon oils and triglycerides of higher molecular weight fatty acid, about 0.05 to 1.0 percent of a hydrophilic cross-linked interpolymer comprising at least about 25 percent by weight of acrylic acid and from about 0.01 to 10.0 percent by weight of a polyunsaturated cross-linking agent which comprises a polyether of a polyhydric alcohol, the hydroxyl groups of said polyhydric alcohol which are modified being etherified with allyl groups, said polyhydric alcohol having at least two allyl groups per molecule, a sufficient amount of at least one alkaline neutralizing agent to substantially completely neutralize said interpolymer, about 0.25 to 10.0 percent of polyoxy lower alkylene ester of a mixture of higher fatty acids of 8 to 18 carbon atoms in which mixture of acids about 40 to 60 percent is lauric acid, 10 to 20 percent of myristic acid and 20 to 40 percent is other fatty acid of 8 to 18 carbon atoms, and about 35 to 65 percent water.

5. An emulsion which has an oily phase and an aqueous phase comprising by weight, based on the total weight of the emulsion, about 30 to 50 percent of water-insoluble oil selected from the group consisting of saturated and unsaturated hydrocarbon oils and triglycerides of higher molecular weight fatty acid and mixtures thereof, about 0.2 to 0.8 percent of substantially completely neutralized hydrophilic cross-linked interpolymer of a mono-olefinic monomer comprising at least about 25 percent by weight of acrylic acid and from about 0.01 to 10 percent by weight of a polyunsaturated cross-linking agent which comprises a polyether of a polyhydric alcohol, the hydroxyl groups of said polyhydric alcohol which are modified being etherified with allyl groups, said polyhydric alcohol having at least two allyl groups per molecule, about 0.75 to 1.5 percent of polyoxy lower alkylene ester of a mixture of higher fatty acids of 8 to 18 carbon atoms in which mixture of acids about 40 to 60 percent is lauric acid, 10 to 20 percent is myristic acid and 20 to 40 percent is of other fatty acid of 8 to 18 carbon atoms, and about 45 to 55 percent water.

6. An emulsion as defined in claim 5 wherein the polymer is a copolymer consisting of 99 percent by weight acrylic acid and 1 percent by weight of polyallyl sucrose in which the sucrose molecule has an average of about 5 to 6 allyl groups.

7. A hair dressing emulsion which has an oily phase and an aqueous phase comprising by weight, based on the total weight of the emulsion, about 25 to 55 percent of a water-insoluble oil selected from the group consisting of saturated and unsaturated hydrocarbon oils and triglycerides of higher molecular weight fatty acid and mixtures thereof, about 0.5 to 1.0 percent of substantially completely neutralized hydrophilic cross-linked interpolymer of a mono-olefinic monomer comprising at least about 25 percent by weight of acrylic acid and from about 0.01 to 10.0 percent by weight of a polyunsaturated cross-linking agent which comprises a polyether of a polyhydric alcohol, the hydroxyl groups of said polyhydric alcohol which are modified being etherified with allyl groups, said polyhydric alcohol having at least two allyl groups per molecule, about 0.25 to 10.0 percent of a polyoxy lower alkylene ester of a mixture of higher fatty acids of 8 to 18 carbon atoms in which mixture of acids about 40 to 60 percent is lauric acid, 10 to 20 percent is myristic acid and 20 to 40 percent is of other fatty acid of 8 to 18 carbon atoms, and about 35 to 65 percent water.

8. A process for preparing an emulsion which has an oily phase and an aqueous phase, comprising mixing together by weight, based on the total weight of the emulsion, at a temperature in a range of about 25° C. to 80° C., while constantly agitating the mixture, about 25 to 55 percent of water-insoluble oil selected from the group consisting of saturated and unsaturated hydrocarbon oils and triglycerides of higher molecular weight fatty acid and mixtures thereof, about 0.25 to 10.0 percent of a polyoxy lower alkylene ester of a mixture of higher fatty acids of 8 to 18 carbon atoms in which mixture of acids about 40 to 60 percent is lauric acid, 10 to 20 percent is myristic acid and 20 to 40 percent is of other fatty acid of 8 to 18 carbon atoms, adding about 0.05 to 1.0 percent of a carboxy vinyl polymer dissolved in water to the mixture, said polymer comprising by weight, based on the total weight thereof, at least about 25 percent of acrylic acid and about from 0.01 to 10.0 percent of a poly-unsaturated cross-linking agent which comprises a polyether of a polyhydric alcohol, the hydroxyl groups of said polyhydric alcohol which are modified being etherified with allyl groups, said polyhydric alcohol having at least two allyl groups per molecule, adding a sufficient amount of an alkaline neutralizing agent to the mixture to substantially completely neutralize said polymer and obtaining a stable emulsion having present therein about 35 to 65 percent of water.

References Cited

UNITED STATES PATENTS

| | | | |
|---|---|---|---|
| 1,927,916 | 9/1933 | Brown et al. | 167—87 |
| 2,773,041 | 12/1956 | Larsen et al. | 260—29.6 |
| 2,798,053 | 7/1957 | Brown | 260—29.6 |

FOREIGN PATENTS 799,951  8/1958  Great Britain.

ALBERT T. MEYERS, *Primary Examiner.*

DONALD CZAJA, SAM ROSEN, *Examiners.*

C. WENDEL, VERA CLARKE, *Assistant Examiners.*